United States Patent [19]

van Lier

[11] 4,175,167
[45] Nov. 20, 1979

[54] ELECTRODE HAVING POLYTETRAFLUOROETHYLENE POWDER DISPERSED ON ITS OUTER SURFACE

[75] Inventor: Johannes A. van Lier, Cleveland, Ohio

[73] Assignee: Union Carbide Corporation, New York, N.Y.

[21] Appl. No.: 892,312

[22] Filed: Mar. 31, 1978

[51] Int. Cl.$^2$ .................................. H01M 10/52
[52] U.S. Cl. .................................... 429/59; 429/212
[58] Field of Search ............... 429/59, 212, 222, 60, 429/217

[56] References Cited

U.S. PATENT DOCUMENTS

| | | | |
|---|---|---|---|
| 3,410,726 | 11/1968 | Harivel | 429/59 |
| 3,536,537 | 10/1970 | Solomon | 429/59 |
| 3,706,601 | 12/1972 | Strier et al. | 429/104 |
| 3,898,099 | 8/1975 | Baker et al. | 252/182.1 |
| 3,954,501 | 12/1976 | Rampel | 429/212 |
| 4,003,754 | 1/1977 | Winsel et al. | 429/222 |

*Primary Examiner*—Donald L. Walton
*Attorney, Agent, or Firm*—Cornelius F. O'Brien

[57] ABSTRACT

A coherent powder electrode having disposed upon and confined to its outer surface only a substantially uniform dispersion of polytetrafluoroethylene particles in an amount of less than 0.5 percent by weight of the active material in the electrode.

6 Claims, No Drawings

ELECTRODE HAVING POLYTETRAFLUOROETHYLENE POWDER DISPERSED ON ITS OUTER SURFACE

FIELD OF THE INVENTION

The invention relates to coherent powder electrodes having polytetrafluoroethylene particles dispersed upon and confined to their surface in an effective amount of less than 0.5 percent by weight of the active material in the electrode so as to aid in oxygen recombination when the electrode is used in rechargeable cells.

BACKGROUND OF THE INVENTION

In a sealed rechargeable cell, such as a nickel/cadmium cell, one of the most important aspects of the cell's cyclic operating mechanism is the generation, transport and recombination of oxygen. This is particularly important during overcharge of the cell since the processes that occur during overcharge of a cell, such as a nickel/cadmium cell, are as follows:

(1) Oxygen is generated at the positive electrode.

(2) The oxygen moves toward the negative electrode along two paths, the first through a gas phase and the second through a liquid phase.

(3) At the negative electrode, the oxygen reacts with Cd to form Cd(OH)$_2$.

The rate of recombination should be equal to or faster than the rate of generation, and gas transport from positive to negative electrode should be fast enough so as not to be a limiting factor in the overall process. Unfortunately, the latter is not usually the case because the oxygen has to travel part of the way through the electrolyte, and the diffusion through electrolyte is a slow process. If a path solely through the gas phase could be provided for, the oxygen recombination reaction would be much enhanced. The basic reactions related to oxygen recombination can be written as follows:

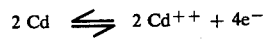  (1)

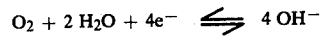  (2)

  (3)

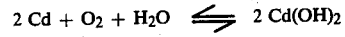  net reaction

All three reactions either occur at the solid-liquid interface or in the liquid phase. For reaction (2) to occur, oxygen has to diffuse through the liquid phase and it is generally assumed that this oxygen diffusion is the limiting step in the recombination reaction. Oxygen transport through the gas phase is orders of magnitude faster than oxygen transport through the liquid. The transport limitation can be minimized by making the distance through the liquid as short as possible. At the same time it should be realized that dry areas of the electrode do not take part in the electrochemical cell reaction. Ideally then, the electrode should have many areas where the liquid layer on the surface is extremely thin (approximately 1 micron).

Polytetrafluoroethylene has been used extensively in electrode applications, especially in the fuel cell area. In most of these applications, however, the polytetrafluoroethylene was sintered and as such it would not provide areas where the liquid layer on the surface would be extremely thin.

U.S. Pat. Nos. 3,630,781 and 3,954,501 disclose the use of polytetrafluoroethylene in depth as a binder in pasted negative electrodes and as an aid to oxygen recombination in both pasted and sintered electrode cells. In addition, these references teach that the polytetrafluoroethylene should not be sintered and that the lower effective level of the polytetrafluoroethylene should be 0.5 percent by weight of the active material and the binder. These references further disclose that when a fluorocarbon polymer is used as an impregnant for nonpasted electrodes, the fibrous form of the polymer permits maximum contact of the active particles with the electrolyte and hence maximum availability. Thus the high degree of hydrophobicity of the fluorocarbon polymers will at the same time render the active material also highly accessible to gas present within a sealed cell during overcharge.

U. S. Pat. No. 3,451,856 discloses the use of nonsintered polytetrafluoroethylene in a fuel cell electrode. Specifically, an electrode having a catalyzed layer is dipped into an aqueous dispersion of polytetrafluoroethylene ranging in concentration from 0.1 percent to 10 percent by weight of the dispersion so as to provide a nonwettable coating for the catalyst layer.

An object of the present invention is to provide on the outer surface only of a coherent powdered electrode a substantially uniform dispersion of polytetrafluoroethylene in an amount less than 0.5 percent by weight of the active material in the electrode, excluding the carrier.

Another object of the present invention is to provide on the outer surface only of a pressed powder cadmium electrode a substantially uniform dispersion of polytetrafluoroethylene in an amount less than 0.5 percent by weight of the active material in the electrode.

Another object of the present invention is to provide a coherent powdered electrode for use in a rechargeable cell wherein the outer surface only of the electrode contains a substantially uniform dispersion of polytetrafluoroethylene in an amount less than 0.5 percent by weight of the active material in the electrode.

Another object of the present invention is to provide a rechargeable cell employing a pressed powder or an impregnated sintered cadmium electrode and wherein disposed on the outer surface only of the cadmium electrode is a substantially uniform dispersion of polytetrafluoroethylene particles in an amount less than 0.5 percent by weight of the active material in the electrode.

The following and additional objects will become more fully apparent from the following description.

SUMMARY OF THE INVENTION

The invention broadly relates to a coherent powder electrode having disposed upon and confined to its outer surface only a substantially uniform dispersion of polytetrafluoroethylene particles in an amount of less than 0.5 percent by weight of the active material in the electrode, said particles being sized about 0.1 micron. Preferably, the polytetrafluoroethylene particle dispersion on the outer surface of the electrode should cover no more than about 65 percent, preferably 50 percent, of the visible surface area of the electrode and be preferably no more than 0.3 micron thick since the polytetrafluoroethylene is not used as a binder and does not impart strength to the electrode. The electrodes so produced in accordance with this invention are ideally suited for use in rechargeable cells. Specifically, cadmium electrodes produced in accordance with this invention are ideally suited for use in nickel/cadmium rechargeable cells.

By employing only a minimum amount of polytetrafluoroethylene particles confined and substantially disposed at the outer surface of the electrode, the loss of capacity due to surface coverage by the polytetrafluoroethylene is minimized. Thus by having a plurality of areas on the outer surface of the electrode covered with particles of polytetrafluoroethylene, many electrolyte-repellent sites are created which provide three-phase boundaries adjacent the particles which will enhance or promote oxygen recombination. Specifically, surrounding each particle is a three-phase annulus composed of a dry ring, a wet ring and a gas contacting both. Too many electrolyte repellent sites would cover too much of the surface of the electrode and thereby obstruct penetration of the electrolyte into the electrode. Thus it is for this reason that the dispersion of discrete particles of polytetrafluoroethylene on the outer surface of the electrode should be limited to an amount of less than 0.5 percent by weight of the active material in the electrode. This 0.5 percent limit has been obtained from experimental data and scanning electron microscope studies.

Electrodes in accordance with this invention can be made by first preparing a coherent powder electrode as are, for example, the compacted powder electrodes described in U.S. Pat. Nos. 3,432,351, 3,310,437 and 3,347,707, said patents being incorporated herein by reference. The coherent electrodes can be then dipped into an aqueous dispersion of polytetrafluoroethylene containing a concentration of up to about 3 percent polytetrafluoroethylene. Upon subsequent removal of the electrode from the dispersion, it is drained and then dried to remove the aqueous medium at room temperature or it could be warmed. When treating cadmium electrodes, the electrodes should not be heated above 125° C. because at that temperature the Cd(OH)$_2$ starts decomposing. However, higher oven temperatures can be used in a continuous type of operation where the residence time of the electrode in such heating zone is short enough to cause evaporation of the aqueous medium thereby preventing overheating of the electrode. For example, it was found that cadmium electrodes can be dried without damage by holding them for 30 seconds between two radiant heaters at a location where a thermocouple indicated a constant temperature of 220° C.

If too much polytetrafluoroethylene is disposed at the surface of the coherent electrode, it will have a tendency to cover the entire outer surface of the electrode and some of the inner surface as well thereby preventing electrolyte penetration into the electrode. Thus it is essential that the polytetrafluoroethylene be confined specifically to the outer surface of the electrode and be present in an amount not to exceed 0.5 percent by weight of the active material in the electrode. Another benefit derived from employing a low concentration of polytetrafluoroethylene in an aqueous dispersion is that when the electrode is left to dry, preferably at room temperature, evaporation of the liquid carrier, such as water, will bring with it the polytetrafluoroethylene particles thereby insuring that the particles remain substantially on the surface of the electrode and do not substantially penetrate into the electrode.

Suitable electrodes for this invention would include cadmium, zinc and their compounds.

EXAMPLE

Two test lots of pressed powder cadmium electrodes were produced as generally disclosed in the above-referred to patents. The electrodes from one test lot were dipped into a 1% aqueous dispersion of polytetrafluoroethylene and upon their removal, the electrodes were dried at room temperature to remove the water. This effectively disposed only on the outer surface of the cadmium electrode the polytetrafluoroethylene particles in an amount less than 0.5 percent by weight of the active material in the electrode.

The electrodes from both test lots along with nickel hydroxide electrodes and an electrolyte of aqueous potassium hydroxide were assembled in a conventional manner to produce rechargeable nickel/cadmium cells as generally disclosed in U.S. Pat. No. 3,310,437.

Each test lot of nickel/cadmium cells (1.2 ampere-hour capacity) was overcharged for two hours at the 1 C rate. The internal pressure of the cells containing the conventional cadmium electrodes was about 165 pounds per square inch while the internal pressure of the cells containing the electrodes treated with polytetrafluoroethylene was only about 30 pounds per square inch.

These data clearly illustrate that using the electrodes of this invention rechargeable cells can be constructed which can be overcharged without building up excessive internal pressure.

While the invention has been described in conjunction with a specific embodiment, it is obvious that certain modifications may be made to the invention without deviating from the scope of the invention.

What is claimed is:

1. A coherent powder electrode having disposed upon and confined only to its outer surface polytetrafluoroethylene particles in an amount of less than 0.5 percent by weight of the active material in the electrode and wherein the polytetrafluoroethylene particles on the outer surface of the electrode cover no more than about 65 percent of the visible surface area of the electrode.

2. The coherent powder electrode of claim 1 wherein the electrode is selected from the group consisting of cadmium, zinc and their compounds.

3. The coherent powder electrode of claim 1 wherein the polytetrafluoroethylene particles on the outer surface of the electrode cover no more than about 50 percent of the visible surface area of the electrode.

4. The coherent powder electrode of claim 3 wherein the electrode is selected from the group consisting of cadmium, zinc and their compounds.

5. The coherent powder electrode of claim 1 for use in a nickel/cadmium rechargeable cell and wherein said coherent powder electrode is a pressed powder cadmium electrode.

6. The coherent powder electrode of claim 5 wherein the polytetrafluoroethylene particles on the outer surface of the electrode cover no more than about 50 percent of the visible surface area of the electrode.

* * * * *